(No Model.)

H. F. MOORE.
APPARATUS FOR PREPARING MASH FOR FERMENTATION.

No. 275,247. Patented Apr. 3, 1883.

(No Model.) 3 Sheets—Sheet 3.

H. F. MOORE.
APPARATUS FOR PREPARING MASH FOR FERMENTATION.

No. 275,247. Patented Apr. 3, 1883.

UNITED STATES PATENT OFFICE.

HARRY F. MOORE, OF NEW RICHMOND, OHIO, ASSIGNOR TO FRANKLIN FARRELL, OF ANSONIA, CONNECTICUT.

APPARATUS FOR PREPARING MASH FOR FERMENTATION.

SPECIFICATION forming part of Letters Patent No. 275,247, dated April 3, 1883.

Application filed July 28, 1882. (No model.)

*To all whom it may concern:*

Be it known that I, HARRY F. MOORE, a citizen of the United States, residing at New Richmond, Clermont county, Ohio, have invented a certain new and useful Improvement in Apparatus for Preparing Mash for Fermentation for the Production of Spirits, of which the following is a full, clear, and exact description.

The object of my invention is to prepare the mash for fermentation by first cooking or boiling the grain under pressure, and then mixing the malt or other grain with it without its coming in contact with the air, and cooling it in this state without admitting any air until it is introduced into the fermenting-tubs. By this process I obtain a much larger yield of spirits by carrying the mash directly from the boiler to a substantially air-tight reservoir before it is passed through the cooler, from which it is pumped through the cooler while a new charge is put in the boiler, thus being enabled to save from two-thirds to three-fourths of the time for mashing the same quantity of grain as by any other process.

The form of the apparatus which I use is shown in the accompanying drawings.

Figure 1:
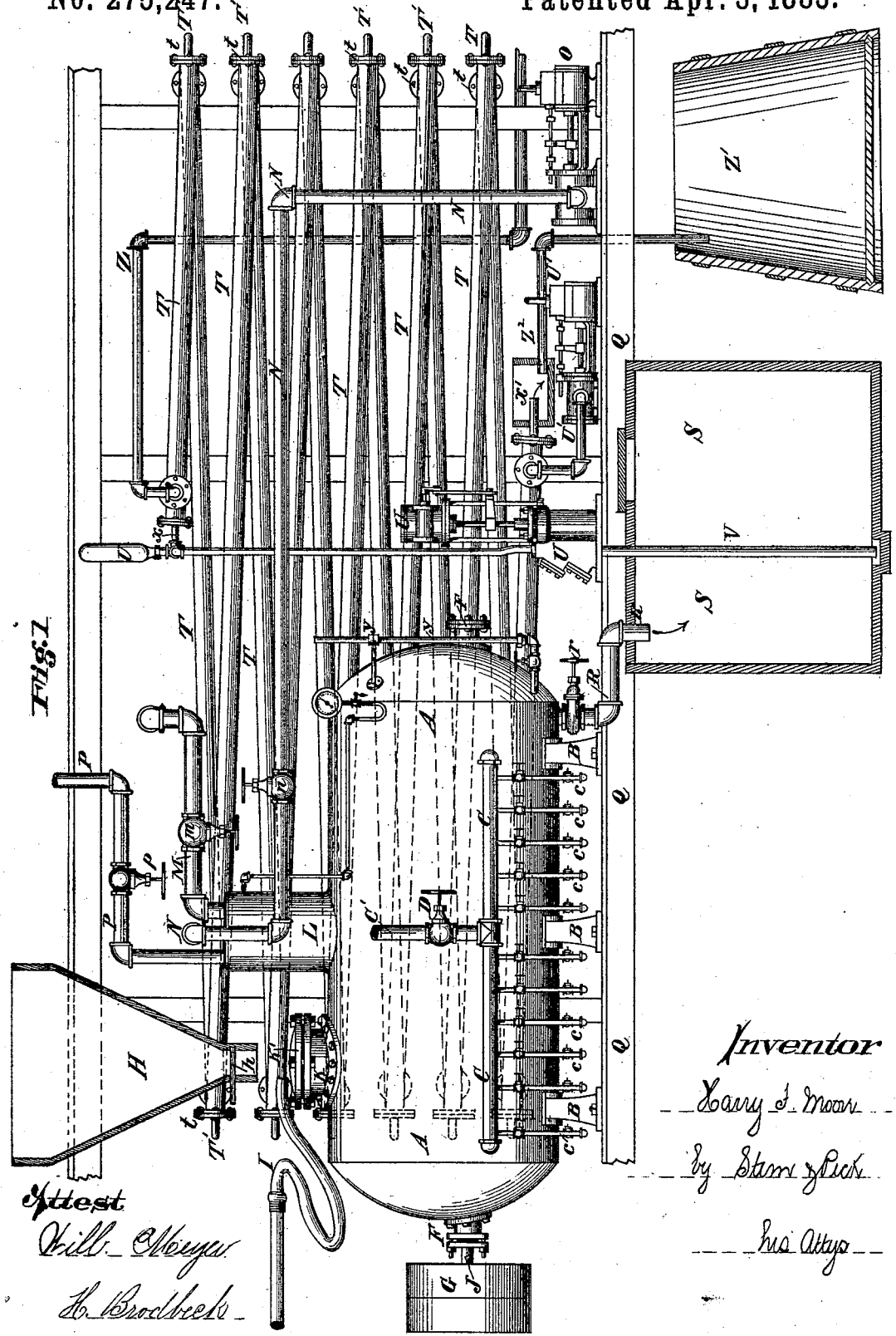
Figure 2:
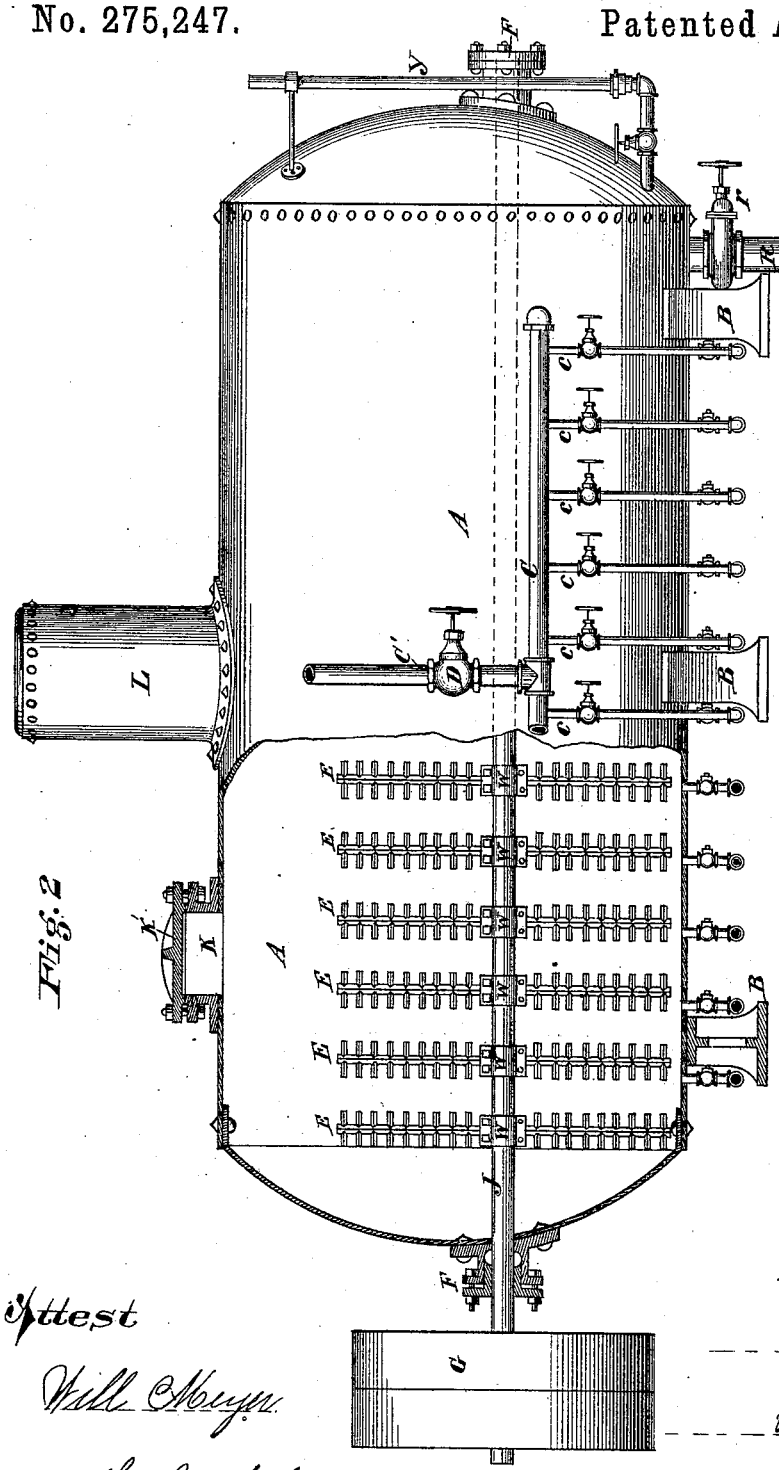
Figure 3:
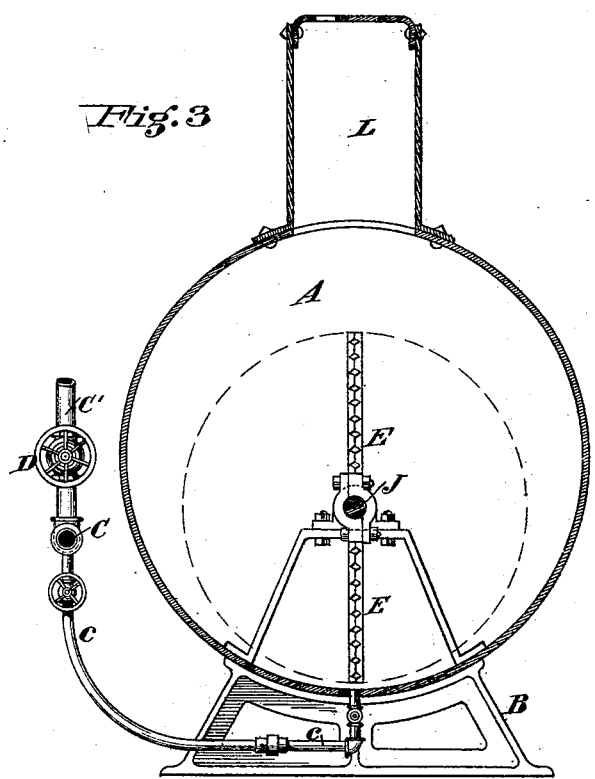
Figure 4:
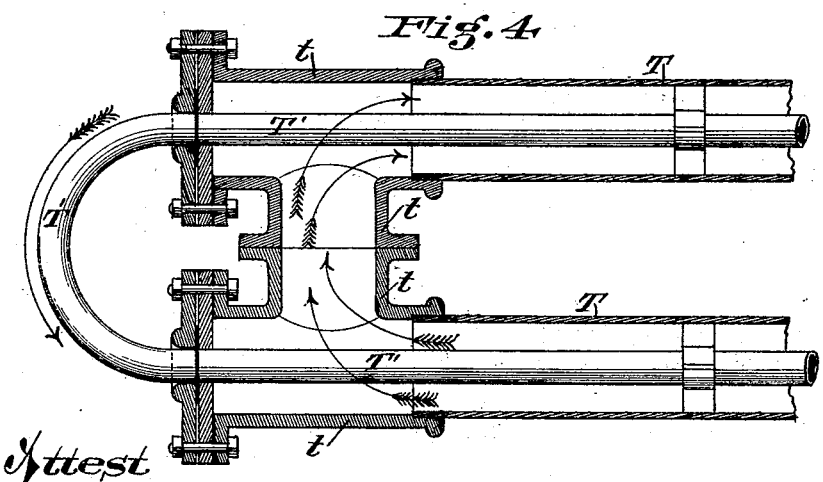

Figure 1, Sheet 1, represents a side elevation of the boiler and reservoir and cooler; Fig. 2, Sheet 2, a side elevation, partly in section, of the boiler; Fig. 3, Sheet 3, a transverse section of the boiler; Fig. 4, Sheet 3, a sectional view of part of the mash-cooler.

A A is a large cylindrical tank, usually made of boiler-iron, and sufficiently strong to withstand the necessary pressure of steam. This tank or boiler is supported above the floor by the standards B B, arranged along its side, or at any convenient point. Parallel with the tank is a steam-pipe, C, to which steam is supplied from an ordinary boiler through the pipe C', provided with a valve, D. To this steam-supply pipe C are attached at close intervals a large number of small distributing-pipes, c c, each provided with a cock. These distributing-pipes enter the tank A in a line along or near its bottom, thus admitting the steam to the tank at its lowest point and distributing it evenly throughout its entire length. This is important, as I have discovered that where it is admitted at one or two points only it fails to effect the contents of the tank evenly and produce the best result, making a difference in the resulting product of from three per cent. to ten per cent. It also effectually prevents burning, (which is almost sure to occur where one or two induction-pipes are used,) thereby greatly improving the quality of the mash, and consequently the spirits, and saves waste of material.

In the ends of the tank A is journaled a shaft, J, somewhat below the center, and bolted to this shaft by suitable boxings are a series of stirrers, E E, (shown in Fig. 2, Sheet 2,) of peculiar shape. These stirrers may be arranged all in the same plane; or they may be staggered through the length of the shaft, thus preventing splashing in the tank. The journals are provided with stuffing-boxes F F, which make the tank perfectly tight. The shaft is revolved by the pulley G.

Above the tank or boiler, near one end, is a hopper, H, usually extending through the floor above. Beneath this hopper is an opening or man-hole, K, covered by an air-tight cap, K'. Through this opening K (the cap being removed) the requisite quantity of water is admitted by the hose I, which is ascertained by the glass gage-tube y, which shows the amount of water in the tank. The gate h of the hopper H is then opened and a proper quantity of grain which has been properly ground is admitted, and is evenly distributed and mixed with the water by the stirrers E E, operated by the pulley G.

The grain must be properly ground before it is admitted to the boiler, as no process of grinding or crushing after it has been subjected to the steam will produce a satisfactory result, because the grain will not be so thoroughly crushed, but more or less of it will be pressed without being broken or ground, and also because it is more liable to scorch and injure the quality of the spirits, as well as cause waste. The grain and water being admitted, the cap K' is tightly screwed down, the valve D opened, and the steam admitted through the small distributing-pipes c c c. The grain being already ground, and being subjected to the heat and pressure of the steam, and being kept constantly in motion by the stirrers, the entire mass is thoroughly and evenly "cooked." This step in the process is very much more effective than where the grain is not ground before it is introduced into the tank. It is less liable to stick to the sides and burn. It is more readily affected by the steam, and a much larger yield of spirits is produced. This result is also greatly facilitated by admitting the steam through a large number of steam-distributing pipes, as c c c, instead of being introduced by one or two large pipes. When the grain has been sufficiently boiled, as above described, it is then necessary to introduce the malt; but before doing this the temperature must be reduced and the steam exhausted.

On the top of the tank, connected to the dome L, is a blow-off pipe, M, provided with a valve, m. The valve D being closed, the valve m is opened and the steam escapes through the pipe M. Connected to the dome L is another pipe, N, provided with a valve, n, and connected with the vacuum-pump O. After the ground grain has been cooked and the steam has been allowed to escape, the valve m is closed and the valve n is opened and the vacuum-pump O is started, which soon exhausts the air in the tank A. The exhaustion of the air while the stirrers are kept in motion cools the mash very rapidly without the aid of water and prepares it for the admission of the malt. The malt or other grain, properly mixed with water, is held in a vessel above the tank, connected with it by the pipe P, provided with a gate, p. The mash being cooled, the valve n is closed and the gate p opened, when a sufficient quantity of malt is quickly drawn into the tank by the suction caused by the exhaustion of the air, and, the stirrers being kept in motion, it is thoroughly mixed with the grain starch or mash.

The tank A is provided with an escape-pipe, R, opened or closed by the gate r. The pipe R, passing through the floor Q Q, opens into the reservoir or well S. This reservoir is substantially air-tight. When the malt and mash have been thoroughly mixed the gate r is opened and the mash flows quickly into the reservoir S, and the tank A may be refilled and the process described repeated. In the meantime the mash is cooled and prepared for the fermenting-tubs by the process to be hereinafter described.

T T represent a series of pipes or a single pipe coiled back and forward to any extent desired or permitted by the room, the ends fastened together by the flange-joints t. Within these pipes T is a copper pipe, T', of much smaller diameter. This inner pipe is connected with the force-pump U, and the outer one, T, with the pump U'. The suction-pipe V of the pump U passes down into the reservoir S, and the pump U being put in operation, the mash is forced up and into the pipe T' at x, and through the long coil of pipe into the trough x', from which it is conveyed directly to the fermenting-tubs Z' through a pipe, Z². At the same time that the pump U is started the pump U' is also put in operation. This pump is connected with a proper supply of cold water, and forces this cold water into and through the pipes T and out at the point Z. The descending current of mash, meeting the ascending current of water, is rapidly cooled, and by jacketing one pipe within another I save much space and make a more effective cooler than by any other way.

By discharging the mash into the reservoir S, instead of letting it pass into the cooler direct from the tank or boiler, I save a large amount of time, as it requires only four or five minutes to empty the tank A into the reservoir S, while it requires about one hour to pass it through my cooler, and from two to six hours to pass it through a cooler where it is forced through by its own gravity. This addition of the receiving tank or reservoir is therefore of great importance, as it permits the boiler to be recharged within from five to ten minutes after the former charge is done, and thereby doubles or triples the capacity of my apparatus, enabling me to prepare from two to four times as much mash in a day as could be obtained by any process where the mash is discharged directly from the boiler into the cooler. Another great saving of time is accomplished by my above-described process of mashing, as I am enabled to mash the grain in a better manner than by the old process with about two-thirds of the amount of water, so when the mash enters the still there is one-third less water in it to be evaporated, and one-third less time is required in the process of distillation, and consequently the capacity of the still increased by one-third and a considerable amount of fuel saved, as it contains less water, it is less in bulk, and requires a smaller number of fermenting-tubs, which is an important feature of economy.

The stirrers E E are constructed of iron, with eight or ten short arms extending at right angles or parallel with the sides of the tank. The stirrers are bolted to the shaft by the boxings W and extend almost to the bottom of the tank.

As I do not grind the grain in the boiler, and admit the steam in a large number of small jets, the mash does not stick to the sides, and scrapers and rollers are done away with.

In prior processes of preparing mash for fermentation it has been customary to discharge the contents of the boiler or mash-tun directly into cooling-pipes and thence to the ferment-tubs, the flow being continuous from the boiler to the fermenting-tubs. Much time, however, is lost by this process, because the flow from the boiler through the cooling-pipes is necessarily slow and the boiler cannot be recharged until it is first entirely emptied. In my invention the process of preparing the mash is very much facilitated, as the whole contents of the boiler can be quickly discharged into the intermediate reservoir by opening the valve between the boiler and said reservoir, and as soon as the boiler is emptied and the valve closed the boiler can be again immediately recharged, and while its contents are being cooked the former converted charge is being slowly drawn from the intermediate reservoir and forced through the cooking-pipes to the fermenting-tubs. The whole process is therefore a nearly continuous one, each part of the apparatus performing its own peculiar functions with but little interruption. The reservoir, moreover, being a closed one, access of air to the mash is not permitted until the latter is properly cooled and delivered to the fermenting-tubs.

Having thus fully described my invention, what I claim is—

The herein-described improvement in apparatus for preparing mash for fermentation in the production of spirits, consisting of the substantially air-tight reservoir located between the mashing-boiler and the cooling apparatus, with its suitable valves and connections for the purpose of enabling the contents of the boiler to be quickly drawn off after being cooked, malted, and mixed, and the boiler to be closed and recharged while the cooling operation is going on by conveyance of the material through the cooler to the fermenting-tubs, substantially as specified.

HARRY F. MOORE.

Witnesses:
DANL. KELLY,
GUS. A. MEYER.